(12) United States Patent
Koste et al.

(10) Patent No.: US 7,266,269 B2
(45) Date of Patent: Sep. 4, 2007

(54) POWER HARVESTING

(75) Inventors: Glen Peter Koste, Niskayuna, NY (US); Min-Yi Shih, Niskayuna, NY (US); Todd Ryan Tolliver, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/014,146

(22) Filed: Dec. 16, 2004

(65) Prior Publication Data

US 2006/0133733 A1   Jun. 22, 2006

(51) Int. Cl.
*G02B 6/02* (2006.01)
*G02F 1/295* (2006.01)

(52) U.S. Cl. ............................ 385/40; 385/8

(58) Field of Classification Search ............ None
See application file for complete search history.

(56) References Cited

U.S. PATENT DOCUMENTS

| | | | | |
|---|---|---|---|---|
| 4,507,538 A | * | 3/1985 | Brown et al. | 219/121.6 |
| 5,545,999 A | * | 8/1996 | Mueller et al. | 324/322 |
| 5,909,306 A | * | 6/1999 | Goldberg et al. | 359/337.1 |
| 6,144,466 A | * | 11/2000 | Mizutani et al. | 358/482 |
| 6,459,841 B1 | * | 10/2002 | Musetti | 385/134 |
| 6,700,310 B2 | | 3/2004 | Maue et al. | |
| 6,724,523 B2 | | 4/2004 | Yap | |
| 2003/0090777 A1 | | 5/2003 | Yap | |
| 2004/0165884 A1 | * | 8/2004 | Al-Chalabi | 398/14 |
| 2004/0208534 A1 | * | 10/2004 | Boertjes et al. | 398/38 |

* cited by examiner

*Primary Examiner*—K. Cyrus Kianni
(74) *Attorney, Agent, or Firm*—Ann M. Agosti; Patrick K. Patnode

(57) ABSTRACT

A power harvesting module comprises at least one electromagnetic (EM) radiation intensity modulator configured to receive a first EM radiation from at least one source and at least one energy converter configured to at least partially convert the energy of the first EM radiation during modulation into electrical energy.

33 Claims, 5 Drawing Sheets

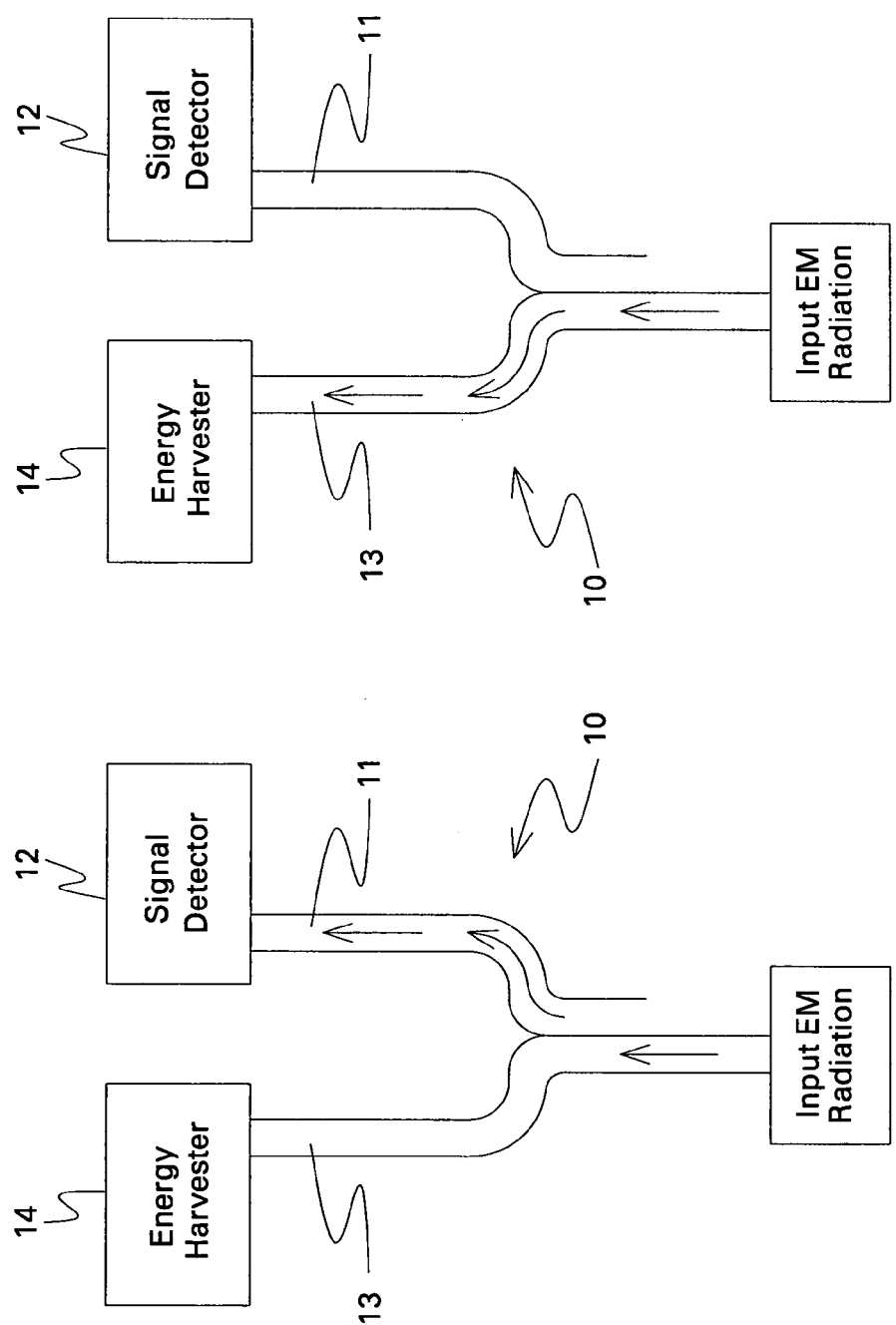

POWER HARVESTING

BACKGROUND

The invention relates generally to harvesting the unused or discarded power from a modulator to generate electrical power. The invention particularly relates to powering electrical circuitry using the harvested power from a modulator during modulation.

Instrumentation with electronics may benefit from having the electronics away from the main power source. In some instrumentation it would be advantages to have an all-optical connection between remote electronics and centralized electronics. If no electrical wire were desired between the remote electronics and centralized electronics, it would be further advantageous to have some means of generating local electrical power optically for electronics located at the remote electronics. Also, it would be desirable to find an advantageous way to power circuitry located remotely where electrical power sources are absent or power is limited.

BRIEF DESCRIPTION

In applications were electromagnetic (EM) radiation is subjected to modulation, part of the EM radiation energy is often discarded or lost during modulation. Also, part of a signal or part of a previously modulated signal may be desirably filtered to increase the quality of the signal. It would be desirable to find a way to extract or harvest the energy discarded during modulation or filtering and to desirably use it to power electronics.

Briefly, in accordance with one embodiment of the present invention, a power harvesting module comprises at least one electromagnetic (EM) radiation modulator configured to receive an EM radiation from at least one source, and at least one energy harvester configured to at least partly harvest the energy of the EM radiation during modulation.

In accordance with a second embodiment of the present invention, a system at least partially powered by EM radiation comprises at least one EM radiation source and at least one power-harvesting module, the power-harvesting module including at least one EM radiation modulator and at least one energy harvester.

In accordance with an aspect of the present invention, a method for harvesting energy from an intensity modulator comprises the steps of configuring the modulator to a determined level of modulation, providing an EM radiation to the modulator from a source, harvesting the energy unused in a modulated EM radiation.

DRAWINGS

These and other features, aspects, and advantages of the present invention will become better understood when the following detailed description is read with reference to the accompanying drawings in which like characters represent like parts throughout the drawings, wherein:

FIG. 1 is a schematic view of a power-harvesting module in accordance with one embodiment of the present invention when power harvesting is at a minimal level.

FIG. 2 is a schematic view of a power-harvesting module in accordance with one embodiment of the present invention when power harvesting is at a maximal level.

DETAILED DESCRIPTION

As used herein, the term "optical radiation" refers to EM radiation in the infrared to the ultraviolet region of the frequency spectrum. As used herein, "adapted to", "configured" and the like refer to devices in a system to allow the elements of the system to cooperate to provide a described effect.

As used herein, the term "modulation" and "filtering" and the like refer to a change in power associated with an EM radiation. As used herein, "modulated", "filtered" and the like refer to changes caused in the overall power of an EM radiation on modulation and are used interchangeably. As used herein, "modulator", "filter" and the like refer to devices that change the overall power of an EM radiation on modulation and are used interchangeably.

One embodiment of the present invention is a power-harvesting module. The module comprises at least one electromagnetic (EM) radiation modulator configured to receive and modulate an EM radiation from at least one source and at least one energy harvester configured to at least partially harvest the energy of the EM radiation unused or discarded in the modulated EM radiation. In one specific embodiment of the present invention, the EM radiation modulator is an optical radiation modulator.

Non-limiting examples of modulators include intensity filters, frequency filters, Mach Zehnder interferometers including optical fiber Mach Zehnders and optical waveguide Mach Zehnders, switches including bistable switches, and switched couplers. In one example, a filter may desirably filter radiation at a wavelength from a source emitting at several wavelengths or a range of wavelengths, the power associated with the filtered radiation may be desirably harvested.

Figure 5:
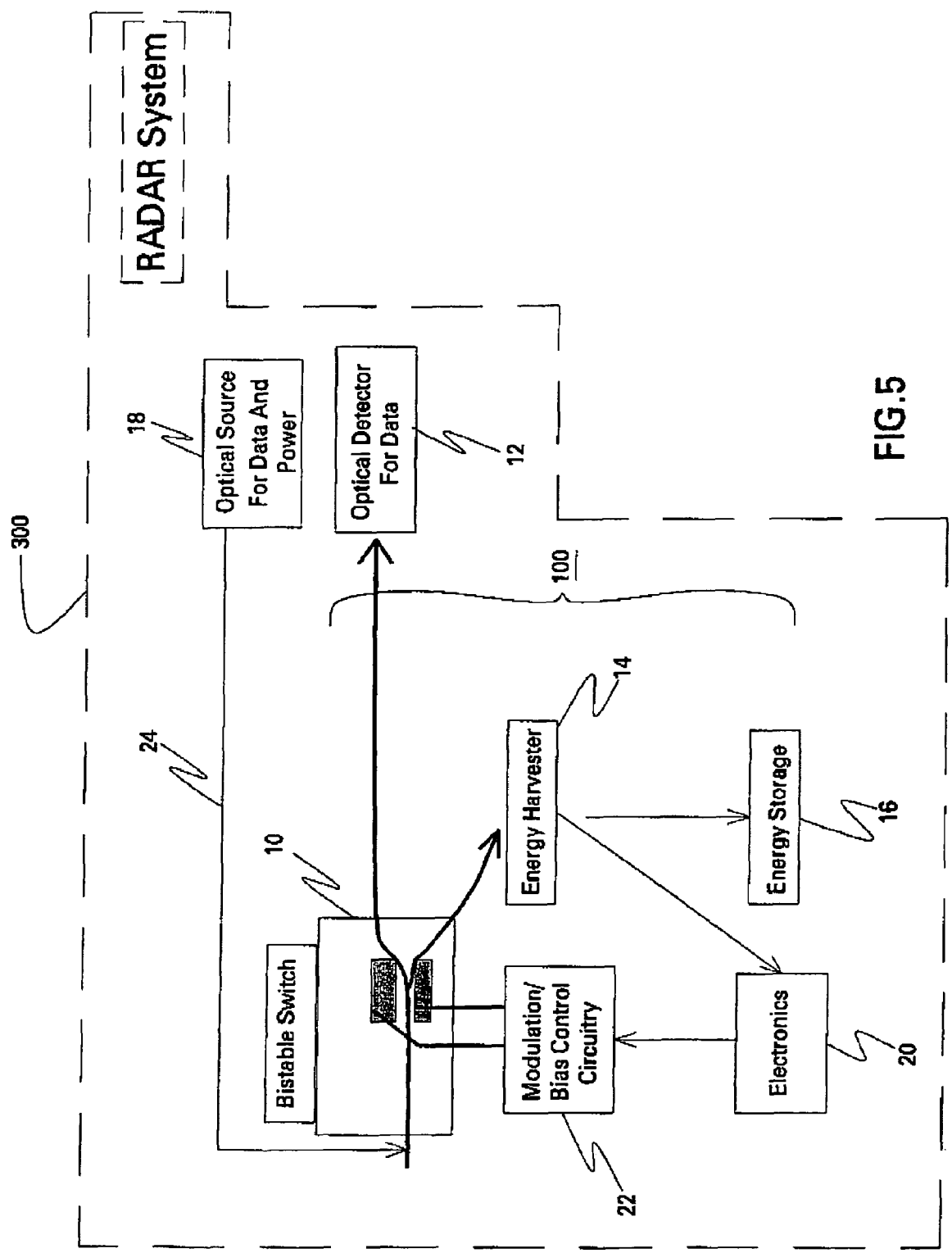
FIG. 5 is a schematic view of a system with a power-harvesting module in accordance with one embodiment of the present invention.

One more specific embodiment of the present invention, as illustrated in FIGS. 1, 2 and 5, is a power-harvesting module comprising an optical bistable (digital or analog) switch intensity (also referred to as amplitude) modulator 10 configured to direct an incident optical radiation into one of its branches. The module further comprises an energy harvester 14 and optionally a signal detector 12. The intensity modulation can be detected at the detector 12 attached to a "signal detection" path 11, for example. The signal path in turn may be coupled to other signal transmission paths. Non-limiting examples of signal transmission paths include fibers and waveguides. The incident EM radiation may also be directed on to a "power harvesting" path 13 of the switch and be incident on the energy harvester 14. In a non-limiting example, during transmission of data, the input EM radiation is modulated between the "signal detection" and "power harvesting" paths at a rapid rate. For example in a digital link, "1"s and "0"s are transmitted to the signal detector 12. To transmit a "1", the switch 10 is configured to be in a minimal power harvesting mode, (FIG. 1), the incident optical radiation is directed on to the "signal detection" path 11 of the switch and most of the power is incident on the signal detector 12. When a "0" is to be transmitted, the switch is configured to be in a maximal power harvesting mode, (FIG. 2), the incident EM radiation is directed on to the "power harvesting" path 13 of the switch, and most of the power is incident on the energy harvester 14. For analog transmission, the data are not discrete "1"s and "0"s, but the operational principles are similar. The energy harvester 14 further comprises an energy converter such as a photovoltaic device.

Figure 4:
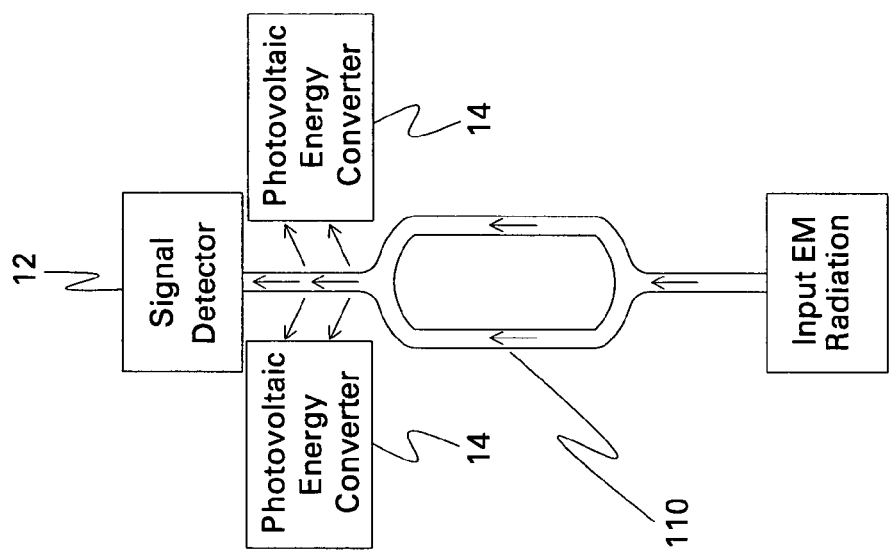
FIG. 4 is a schematic view of a power-harvesting module in accordance with a second embodiment of the present invention when power harvesting is at a maximal level.
Figure 3:
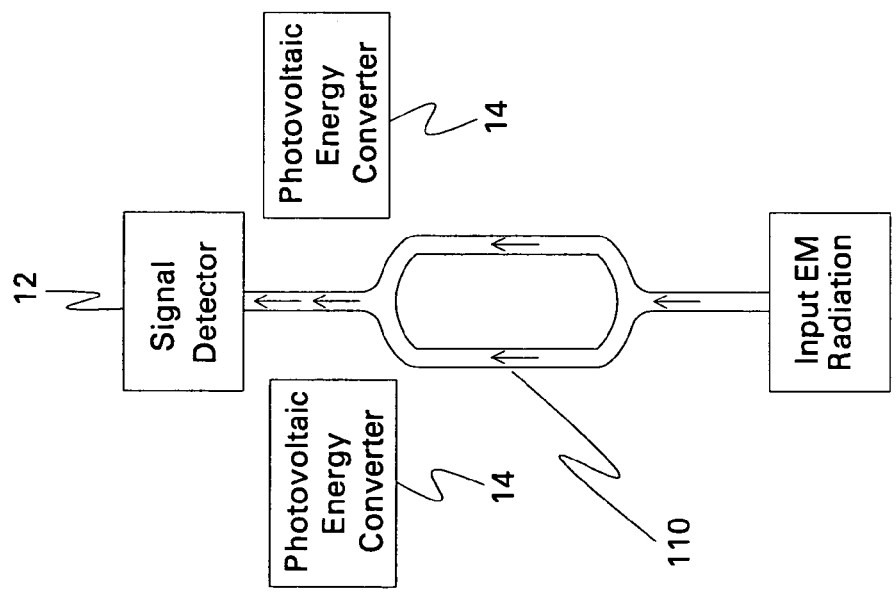
FIG. 3 is a schematic view of a power-harvesting module in accordance with a second embodiment of the present invention when power harvesting is at a minimal level.
Figure 6:
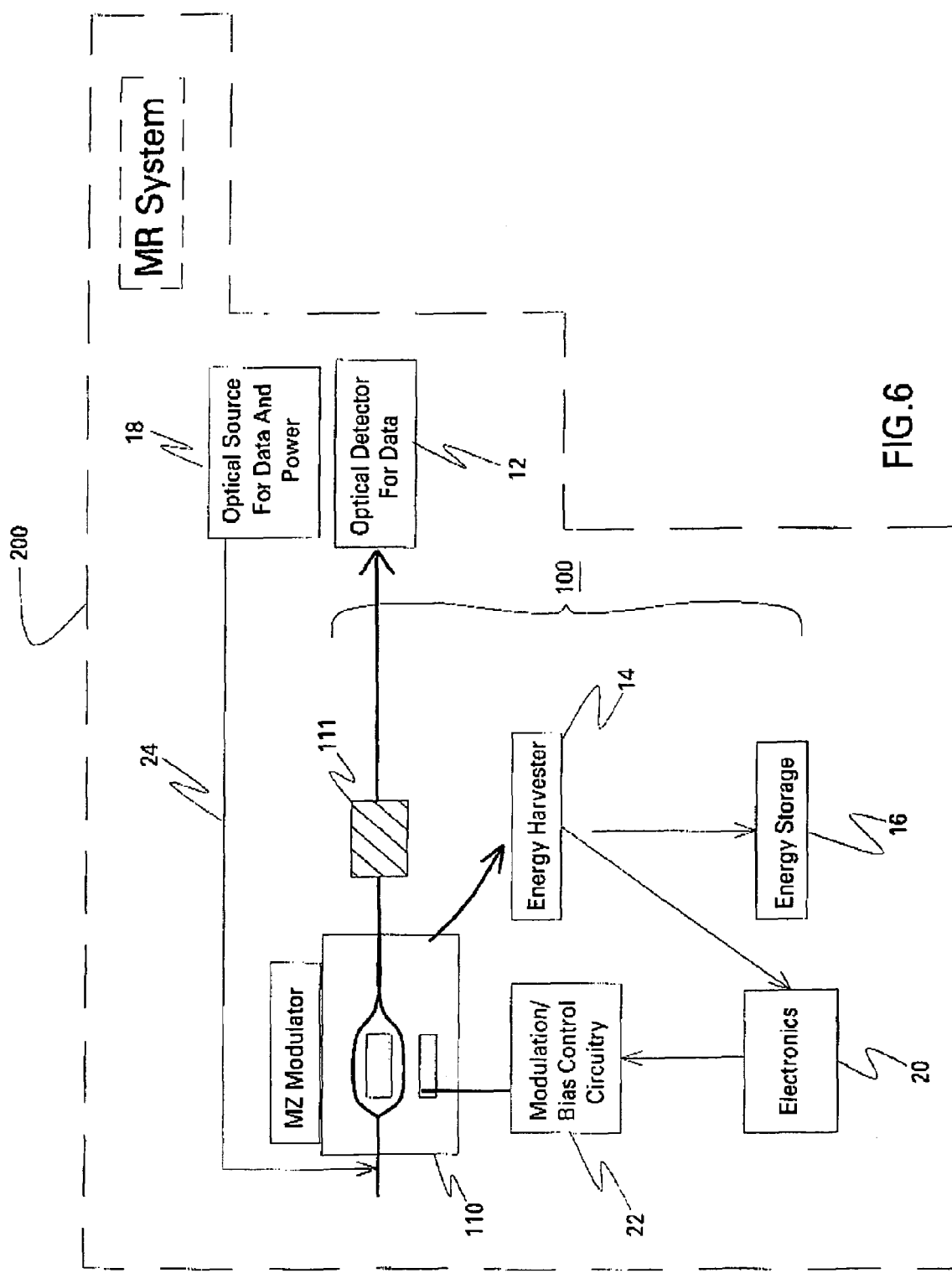
FIG. 6 is a schematic view of a system with a power-harvesting module in accordance with one embodiment of the present invention.

Another embodiment of the present invention, as shown in FIGS. 3, 4, and 6, is a power-harvesting module comprising a Mach Zehnder interferometer modulator. A Mach-Zehnder interferometer works by splitting an incident optical radiation into at least two beams and by introducing a phase shift between the optical beams along the two arms of the interferometer, typically by modifying the index of refraction along one or both arms of the Mach-Zehnder, and subsequently interfering the two beams. In a non limiting example, an electrical means such as a voltage signal can be used to cause the refractive index shift and hence the modulation of the incident optical radiation. Other means of modulating the incident optical radiation, such as but not limited to thermal, magnetic and chemical (or other environmental parameters) also fall within the scope of this invention. The power-harvesting module further comprises an energy harvester 14 and optionally a data signal detector 12.

If the two optical beams recombine to interfere constructively, a large intensity results in the output of the optical fiber Mach Zehnder. However, if they interfere destructively, a lower intensity is transmitted out of the Mach Zehnder. In such a scenario of destructive recombination of the optical beams, the optical energy no longer propagates within the fiber core, instead the energy leaks into the surrounding cladding.

In a Mach Zehnder modulator 110, when the two optical beams recombine to interfere constructively and a large intensity is incident on the data detector 12, (FIG. 3), the modulator is in a minimal power harvesting mode. In a minimal power harvesting mode, the power incident on the harvester is 0% or a value higher than 0% of the incident radiation, determined by any power leakage into the power-harvesting path. When the optical beams interfere destructively, and a lower intensity is transmitted out of the Mach Zehnder on to the data detector 12, (FIG. 4), the Mach Zehnder is in a maximal power harvesting mode. In a maximal power harvesting mode, the power incident on the harvester could be 100% or a value less than 100% of the incident radiation, determined by any power loss due to leakage or other factors. The energy leaking into the cladding is incident on the energy harvester 14. The energy harvester further comprises at least one energy converter such as, but not limited to, a photovoltaic device. In one embodiment the energy leaking into the cladding is collected using photovoltaic devices integrated into the Mach-Zehnder modulator. The use of optical elements such as but not limited to lenses and gratings to enable more efficient energy harvesting is within the scope of this invention.

Another embodiment of the present invention is a system at least partially powered by EM radiation comprising at least one EM radiation source 18 and at least one power-harvesting module 100. The power-harvesting module includes at least one EM radiation modulator 10, 110 and at least one energy harvester 14. The system further comprises a signal detector 12 to detect the modulated optical signals. The system further comprises at least one optical conduit 24 for transmitting the optical radiation from the source 18 to the modulator 10, 110. As used herein "optical conduit" means one or more optical mediums such as optical fibers or waveguides, for example. In one embodiment, optical conduit 24 comprises optical fibers. The optical conduit may further be configured to transmit the modulated optical signals to the detector 12 or an additional optical conduit may be present to transmit the modulated optical signals.

The energy harvester receives the unused or discarded part of the EM radiation and desirably converts the energy associated with it to electrical energy. The system includes at least one storage device 16, which stores the electrical energy harvested by the energy harvester 14. In a further embodiment the system includes a bias control circuitry 22 to dynamically control data collection and power harvesting. In still further an embodiment the system includes additional electronic devices 20 (herein meaning optical, apto-electronic, electro-optic, or electrical devices) such as bias circuits, pro-amplifiers, analog-to-digital converters, or other electronics powered by the energy harvested. In one embodiment of the present invention is a system including a bistable switch (FIG. 5). In another embodiment of the present invention is a system including a Mach Zehnder modulator (FIG. 6). The system may desirably be wholly or partly optically powered.

In one embodiment of the present invention, the energy harvester in power-harvesting module further comprises at least one energy converter. Non-limiting examples of energy converters include but not limited to photovoltaic devices and RF energy to electrical energy converters.

In a further embodiment of the present invention, the power harvesting module further comprises at least one energy storage device to store the energy harvested. Non-limiting examples of energy storage devices include but not limited to capacitors and electrochemical devices such as batteries.

In a still further embodiment of the present invention, the power-harvesting is dynamically controlled. The modulator bias level or modulation depth is adjusted to optimize power harvesting efficiency. The power harvesting module may further comprise a controller to dynamically control the EM radiation modulation and hence the power harvesting.

Many systems, such as Magnetic Resonance systems 200, operate in varied modes, wherein in some modes, the data collection is intermittent or the duty cycle (data collection/acquisition rate) is low. Further, in such systems where a modulator is used to encode data on to an EM signal, the modulator can be desirably biased for maximum power harvesting when data is not being collected.

One embodiment of the present invention is a magnetic resonance imaging (MRI) system with a power-harvesting module. The MRI system comprises at least one MRI detector configured to sense a plurality of electromagnetic signals and a power harvesting module comprising a modulator coupled to the MRI detector and configured to modulate optical signals with the electromagnetic signals to generate corresponding modulated optical signals. In one embodiment, the optical signals are provided to the modulator by a laser source through an optical conduit. The optical conduit may further be configured to transmit the modulated optical MR signals from inside a shielded environment, wherein the power harvesting module may be present, to outside the shielded environment. The power-harvesting module further comprises an energy harvester. The energy harvester further comprises an optical to electrical power conversion device for converting the optical power signals into electrical power for storage or for use by at least one device circuit. Other magnetic resonance systems such as magnetic resonance spectroscopy systems, which can be used to analyze material properties can also benefit from the present techniques. This harvested power can be used to run bias circuits, pre-amplifiers, analog-to-digital converters, or other electronics located at the sensing head. Non-limiting examples of storage devices include capacitors and electrochemical storage devices such as batteries.

In one embodiment of the present invention is a radio detection and ranging (RADAR) system 300 with a power harvesting module. Typically, data is transmitted to and from a RADAR antenna in one location to a processing hardware in a second location remote from the first location. Data is desirably encoded on to an optical signal by correspondingly modulating the optical signal in such cases and transmitted to the desired location via an optical conduit typically comprising optical fibers. The energy in the optical signal unused in the modulated signal may in such cases be desirably harvested and desirably used to power electronics at the location. In a further embodiment is a photonic phased-array radar system, with a power-harvesting module. In such systems, the radar signal is processed by encoding the information in the radar signal on to an optical signal. An optical signal such as from a laser beam source is split into multiple beams through many fibers, each of which is typically associated with an element in the array. Desirably at least a part of the signal is passed through a modulator. The modulator is driven by a waveform that is either the same as, or is strongly correlated with the incoming radar signal. The optical signal associated with each array element is modulated. The energy in the optical signal unused in the modulated signal may in such cases be desirably harvested using an energy harvester and desirably converted to electrical energy to power electronic circuitry or Stored in a storage device.

Still another embodiment of the present invention is a system such as but not limited to an optical frequency or Radio Frequency (RF) amplitude modulation system or detection system. In an amplitude modulation system, a signal is modulated to encode certain information. The energy unused or discarded in the modulated signal may desirably be harvested. In a further embodiment of the system, when encoded information is desirably carried in at least a side band of an information signal obtained by modulating a carrier frequency signal, the carrier frequency can be desirably filtered, typically using a carrier suppression filter (111), and the power associated harvested. By eliminating a component of the information signal, the performance of a detector configured to detect the information signal may be enhanced due to noise reduction. In some embodiments, power harvesting desirably happens both when a carrier signal is modulated to create an information signal, and when the information signal is filtered to remove the carrier frequency component.

In one aspect of the present invention is a method for harvesting energy from an intensity modulator. The method includes the steps of configuring the modulator to a level of power (energy) harvesting, providing an EM radiation to the modulator from an EM source, and harvesting the energy of the EM radiation unused or discarded in a modulated EM radiation. In a further aspect of the present invention the configuring is dynamic configuring comprising the use of a bias circuit to vary a bias voltage to adjust the modulation level and hence the harvested energy.

The nature of the dependence of the transmitted intensity on the applied bias voltage is determined by the modulator construction. In a non-limiting example, for a Mach Zehnder the dependence is desirably described as a raised cosine function. The device performance is characterized by a parameter $V_\pi$, which is the amount of voltage required to change the relative phase of the two arms of the Mach Zehnder by $\pi$. When the phase difference is zero, the signals interfere constructively. Conversely, when the phase difference is $\pi$ radians, the signals interfere destructively. As the voltage is varied from a given zero phase difference voltage $V_0$ to $V_\pi$, the intensity or power transmitted varies from about 100% to about 0% of the input intensity, inversely, the intensity or power available for harvesting varies from 0% to 100% as shown in FIGS. 7 and 8.

Figure 7:
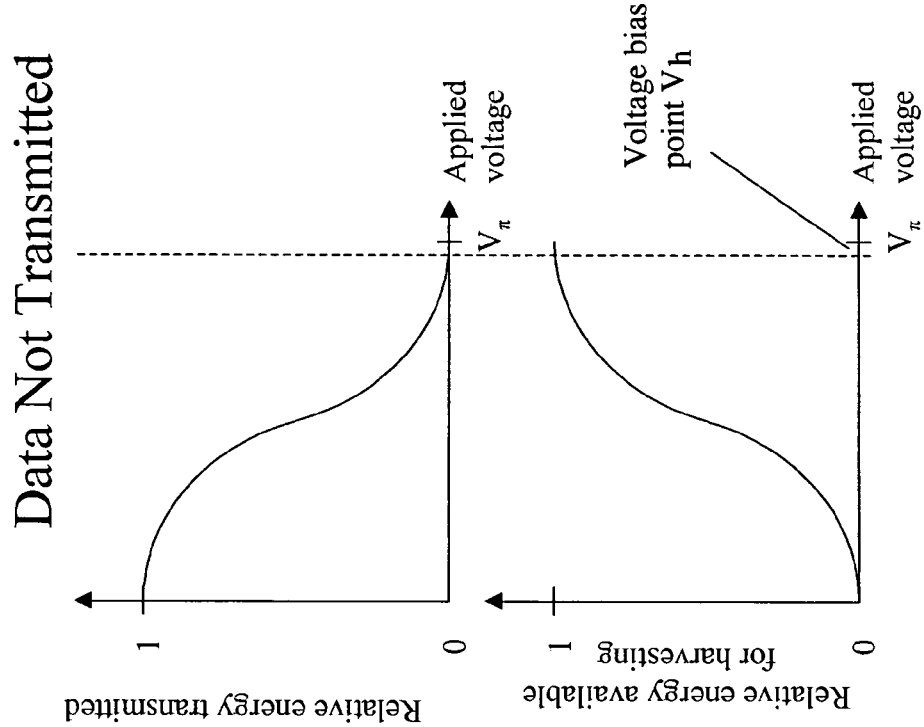
FIG. 7 is a graphical representation of the power transmitted and power available for harvesting in a power-harvesting module in accordance with one aspect of the present invention, when data is desirably transmitted.
Figure 8:
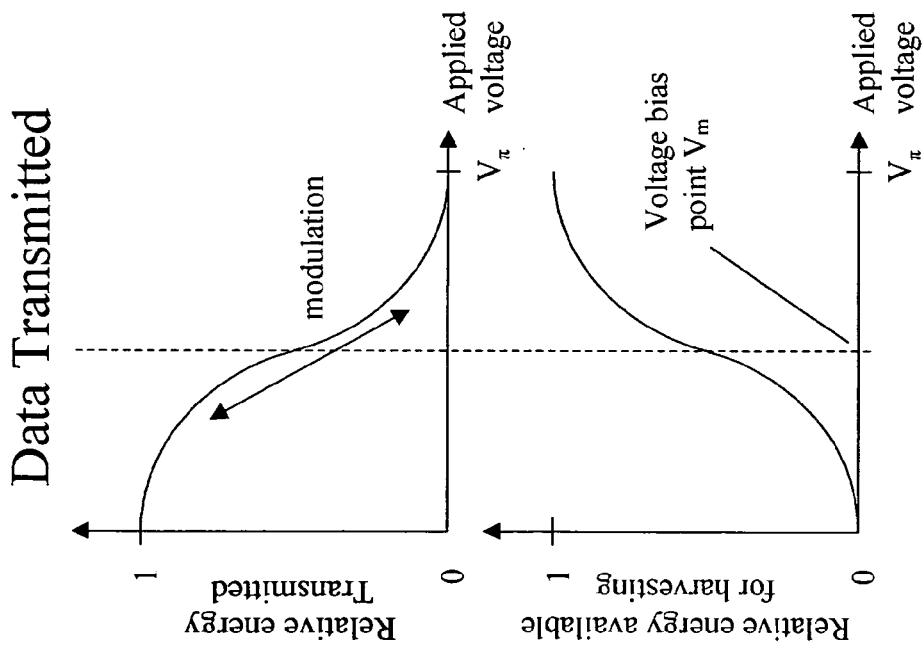
FIG. 8 is of the power transmitted and power available for harvesting in a power-harvesting module in accordance with one aspect of the present invention, when data is not transmitted.

Dynamic configuring, further comprises configuring for data transmission or optimal modulation performance when desired, by configuring the voltage to about the bias point $V_m$ as shown in FIG. 7, and when data is not desired to be transmitted, reconfiguring dynamically the bias point to about $V_H$, as shown in FIG. 8, to configure the modulator for optimized power harvesting. When data is transmitted, the bias point can be adjusted for highest dynamic range and noise performance. Energy can be similarly harvested in other modulator structures with different transmittance vs. voltage curves by identifying the optimal points for energy harvesting and modulator performance and configuring the modulator as desired.

Harvesting comprises using energy harvesters to receive the harvested EM radiation. The method further includes the step of converting the energy, for example, from EM radiation energy to electrical energy or chemical energy. The method further includes the step of storing the harvested energy in energy storage device. The method further includes the step of converting the energy stored for example from EM radiation energy to electrical energy or chemical energy Non-limiting examples of storage devices include capacitors and electrochemical storage devices such as batteries. The method can further include using filters to remove discarded parts of the modulated EM radiation. For example a carrier wave subjected to amplitude or intensity modulation may be subjected to further filtration to separate the side bands, which carry information, and the carrier band. The energy associated with the carrier band can then be desirably harvested. The method further comprises converting the filtered EM radiation energy into electrical energy.

A desirable benefit of this invention is the elimination or reduction in the amount of photonic power sources required to power a system over optical fiber by harnessing the energy that is typically lost.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power harvesting module comprising:
at least one electromagnetic (EM) radiation modulator configured to receive and modulate an EM radiation from at least one source, wherein at least a part of the energy of the EM radiation is unused or discarded at the modulator during modulation to provide a modulated EM radiation;

at least one energy harvester configured to at least partially harvest the energy of the EM radiation unused or discarded at the modulator; and a bias circuit to dynamically vary a bias voltage to control the performance of the power harvesting module.

2. The power harvesting module of claim 1, wherein the modulator comprises at least one filter.

3. The power harvesting module of claim 2, wherein at least one filter is a carrier suppression filter to help harvest energy from a modulated carrier frequency signal.

4. The power harvesting module of claim 1, wherein the EM radiation modulator comprises at least one optical modulator.

5. The power harvesting module of claim 4, wherein the optical modulator comprises a Mach Zehnder modulator.

6. The power harvesting module of claim 4, wherein the optical modulator comprises a switch.

7. The power harvesting module of claim 6, wherein the optical switch comprises a bistable switch.

8. The power harvesting module of claim 4, wherein the optical modulator comprises an optical fiber modulator.

9. The power harvesting module of claim 1, wherein the energy harvester comprises at least one energy converter.

10. The power harvesting module of claim 9, wherein the energy converter comprises an optical energy to electrical energy converter.

11. The power harvesting module of claim 10, wherein the energy converter comprises at least one photovoltaic device.

12. The power harvesting module of claim 9, wherein the energy converter and the EM radiation modulator comprise an integral assembly.

13. The power harvesting module of claim 9, wherein the energy converter comprises at least one radio frequency energy converter.

14. The power harvesting module of claim 1, further comprising at least one energy storage device configured to store the electrical energy.

15. The power harvesting module of claim 14, wherein the energy storage device comprises at least one capacitor.

16. The power harvesting module of claim 14, wherein the energy storage device comprises at least one electrochemical storage device.

17. The power-harvesting module of claim 1, further comprising a controller for controlling dynamic power harvesting.

18. A system at least partially powered by EM radiation comprising:

at least one EM radiation source; and at least one power harvesting module, the power harvesting module including at least one EM radiation modulator configured to modulate EM radiation from the at least one EM radiation source, wherein at least a part of the energy of the EM radiation is unused or discarded at the modulator during modulation to provide a modulated EM radiation, and at least one energy harvester configured to at least partially harvest the energy of the EM radiation unused or discarded at the modulator.

wherein the energy harvester comprises at least one RF energy converter.

19. The system of claim 18, wherein the EM radiation source comprises a laser.

20. The system of claim 18, wherein the EM radiation modulator comprises a Mach Zehnder modulator.

21. The system of claim 18, wherein the EM radiation modulator comprises a switch.

22. The system of claim 18, wherein the EM radiation modulator comprises a filter.

23. The system of claim 22, wherein the system further comprises a carrier suppression filter to help harvest energy from a modulated EM radiation.

24. The system of claim 18, wherein the EM radiation source is situated inside a shielded environment.

25. The system of claim 18, wherein the EM radiation source is situated outside a shielded environment.

26. The system of claim 18, further comprising an optical conduit configured to transmit the EM radiation to the modulator, wherein the optical conduit comprises at least one optical fiber.

27. The system of claim 18, wherein the energy harvester comprises at least one photovoltaic device.

28. The system of claim 18, wherein the system comprises a Magnetic resonance system.

29. The system of claim 28, wherein the system comprises a Magnetic resonance spectroscopy system or a Magnetic resonance imaging system.

30. The system of claim 18, wherein the system comprises a radar system.

31. The system of claim 18, wherein the system further comprises at least one energy storage device.

32. The system of claim 18, wherein the system further comprises electronics powered by the energy harvested by the power-harvesting module.

33. A magnetic resonance imaging system at least partially powered by EM radiation comprising:

an MRI detector;

at least one EM radiation source; and at least one power harvesting module, the power harvesting module including at least one EM radiation modulator configured to modulate EM radiation from the at least one EM radiation source, wherein at least a part of the energy of the EM radiation is unused or discarded at the modulator during modulation to provide a modulated EM radiation, and at least one energy harvester configured to at least partially harvest the energy of the EM radiation unused or discarded at the modulator.

* * * * *